United States Patent
Paulsen et al.

(10) Patent No.: US 9,979,021 B2
(45) Date of Patent: May 22, 2018

(54) STOICHIOMETRICALLY CONTROLLED LITHIUM COBALT OXIDE BASED COMPOUNDS

(71) Applicant: Umicore, Brussels (BE)

(72) Inventors: Jens Paulsen, Yuseong-Gu (KR); Maxime Blangero, Cheonan (KR); Da-In Choi, Cheonan (KR)

(73) Assignee: Umicore, Brussels (BE)

( * ) Notice: Subject to any disclaimer, the term of this patent is extended or adjusted under 35 U.S.C. 154(b) by 0 days. days.

(21) Appl. No.: 14/855,456

(22) Filed: Sep. 16, 2015

(65) Prior Publication Data

US 2016/0006032 A1 Jan. 7, 2016

Related U.S. Application Data

(63) Continuation-in-part of application No. 14/125,431, filed as application No. PCT/EP2012/059986 on May 29, 2012.

(60) Provisional application No. 61/498,038, filed on Jun. 17, 2011.

(51) Int. Cl.

| | |
|---|---|
| *H01M 4/525* | (2010.01) |
| *C01G 51/00* | (2006.01) |
| *C01D 15/02* | (2006.01) |
| *H01M 4/36* | (2006.01) |
| *H01M 4/485* | (2010.01) |
| *H01M 4/50* | (2010.01) |
| *H01M 4/52* | (2010.01) |
| *H01M 10/052* | (2010.01) |
| *H01M 4/02* | (2006.01) |

(52) U.S. Cl.
CPC ............ *H01M 4/525* (2013.01); *C01D 15/02* (2013.01); *C01G 51/42* (2013.01); *H01M 4/366* (2013.01); *H01M 4/485* (2013.01); *C01P 2002/72* (2013.01); *C01P 2002/86* (2013.01); *C01P 2004/03* (2013.01); *C01P 2004/51* (2013.01); *C01P 2004/80* (2013.01); *C01P 2004/82* (2013.01); *C01P 2006/11* (2013.01); *C01P 2006/40* (2013.01); *C01P 2006/80* (2013.01); *H01M 4/50* (2013.01); *H01M 4/52* (2013.01); *H01M 10/052* (2013.01); *H01M 2004/021* (2013.01)

(58) Field of Classification Search
CPC ........ H01M 4/366; H01M 4/485; H01M 4/50; H01M 4/52; H01M 4/525
See application file for complete search history.

(56) References Cited

U.S. PATENT DOCUMENTS

| | | |
|---|---|---|
| 6,372,385 B1 | 4/2002 | Kweon et al. |
| 6,984,469 B2 | 1/2006 | Kweon et al. |
| 7,235,193 B2 | 6/2007 | Park et al. |
| 2003/0071661 A1 | 4/2003 | Eguchi |
| 2003/0180615 A1 | 9/2003 | Johnson |
| 2009/0148772 A1* | 6/2009 | Kawasato ............... C01G 51/42 429/223 |
| 2010/0143799 A1* | 6/2010 | Park ...................... H01M 4/485 429/219 |

FOREIGN PATENT DOCUMENTS

| | | |
|---|---|---|
| CN | 1848491 A | 10/2006 |
| EP | 1136446 | 9/2001 |
| JP | 2003-221234 A | 8/2003 |
| JP | 2003221234 * | 8/2003 |
| JP | 2006-331943 A | 12/2006 |
| JP | 2007-258095 A | 10/2007 |
| JP | 2008-311132 A | 12/2008 |
| JP | 2010-532075 A | 9/2010 |
| KR | 2003-0083476 A | 10/2003 |
| WO | 2007/052712 A1 | 5/2007 |
| WO | 2010/139404 | 12/2010 |

OTHER PUBLICATIONS

Julien, "Structure, Morphology and Electrochemistry of Doped Lithium Cobalt Oxides", Ionics 6 (2000).*
JP 2003221234—Translation.*
Chen, Z., et al., "Improving the Capacity Retention of LiCoO2 Cycled to 4.5 V by Heat-Treatment", Electrochemical and Solid-State Letters, vol. 7, No. 1, (2004), pp. A11-A14.
Levasseur, S., et al., "On the Dual Effect of Mg Doping in LiCoO2 and Li1+o,CoO2: Structural, Electronic Properties, and 7Li MAS NMR Studies", Chem. Mater., vol. 14 (2002); pp. 3584-3590.
International Search Report dated Sep. 6, 2012 for PCT/EP2012/059986.
Japanese translation of JP 2003221234.
Hong, et al., "Modification of LiCoO$_2$ by Surface C oating with MgO/TiO$_2$/SiO$_2$ for High-Performance Lithium-Ion Battery", Electrochemical and Solid-State Letters, vol. 9, No. 2, (2006), pp. A-82-A85.
Office Action from corresponding U.S. Appl. No. 14/125,431, dated Mar. 10, 2017.
Office Action from corresponding U.S. Appl. No. 15/064,669, dated Jan. 19, 2017.

* cited by examiner

Primary Examiner — Ladan Mohaddes
(74) Attorney, Agent, or Firm — Brinks Gilson & Lione

(57) ABSTRACT

A lithium metal oxide powder for use as a cathode material in a rechargeable battery, consisting of a core material and a surface layer, the core having a layered crystal structure consisting of the elements Li, a metal M and oxygen, wherein the Li content is stoichiometrically controlled, wherein the metal M has the formula $M=Co_{1-a}M'_a$, with $0 \le a \le 0.05$, wherein M' is either one or more metals of the group consisting of Al, Ga and B; and the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr and Si.

18 Claims, 9 Drawing Sheets

(a)

(b)

STOICHIOMETRICALLY CONTROLLED LITHIUM COBALT OXIDE BASED COMPOUNDS

This application is a continuation-in-part of U.S. application Ser. No. 14/125,431, filed Apr. 3, 2014, which is a national stage application of International Application No. PCT/EP2012/059986, filed May 29, 2012, which claims the benefit of U.S. Provisional Application No. 61/498,038, filed Jun. 17, 2011, the entire contents of these applications are hereby incorporated herein by reference.

TECHNICAL FIELD AND BACKGROUND

The invention relates to high voltage stable and high density lithium metal oxide powderous compounds, containing a core and an electron insulating surface. The compounds may comprise elements such as Mg, Ti and Al for obtaining improved high voltage electrochemical performances and improved energy density. Also a method to manufacture these materials is disclosed. The lithium transition metal oxide powder can be used as a cathode active material in rechargeable lithium batteries.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. As today's consumer electronics demand rechargeable batteries with higher energy density, there is a surge towards $LiCoO_2$-based materials with increased specific capacity for more demanding end applications.

Two common ways to improve the energy density are (a) to increase the charge voltage, typically 4.5V or even 4.6V vs. Li metal when fitted in coin cells, and 4.35V and 4.4V vs. graphite when fitted in full cells, which requires more robust cathode materials which can be charged at higher voltage and (b) to increase the packing density, which requires to increase the particle size of the powder particles. Industrial applicability of these two approaches is however limited by side problems.

On the one hand, increasing the charge voltage leads to unstable behavior of the electrode, resulting in cathode degradation linked with electrolyte decomposition. As lithium is removed from $Li_xCoO_2$ (x<1), oxidation of $Co^{3+}$ to an unstable oxidation state $Co^{4+}$ follows. The higher the charge voltage, the higher the amount of $Co^{4+}$. Large concentrations of $Co^{4+}$ increase unwanted side reactions between electrolyte and charged cathode. The characterization of phase transitions during charging-discharging, hence as a function of x in $Li_xCoO_2$, has played a central role in the study of this material, as phase changes can introduce irreversibility with repeated charge and discharge. Several investigations have identified phase transitions in layered $Li_xCoO_2$ above 4.3 V. $LiCoO_2$ is isostructural with the rhombohedral R-3m α-$LiFeO_2$ and is referred to as "O3". The O3 structure can be thought of as an ordered rock salt with an oxygen close packing sequence ACBACB and the Co and Li ions forming $CoO_2$ and $LiO_2$ planes of edge-shared octahedra alternately ordered in the (111) direction. When Li is removed a two phase region is observed when x is less than about 0.75. The driving force of the two phase domain is thought to be a Mott-insulating transition from localized spin-holes to metallic like conductivity when x~0.75. At x=0.5 and V~4.15V, a monoclinic transition occurs driven by Li/vacancy ordering and charge ordering within the $CoO_2$-planes. When more Li is deintercalated; $Li_xCoO_2$ undergoes a cascade of first-order phase transitions with the appearance of a monoclinic H1,3 phase near 4.55V (x~0.2) and eventually the formation of a fully delithiated hexagonal O1 $CoO_2$ phase with ABAB oxygen packing sequence at 4.62V. See for example A. Van der Ven, M. K. Aydinol, and G. Ceder, in *J. Electrochem. Soc.*, 145, 2149 (1998). Such structural transitions at high voltage from O3, H1,3 and O1 induce $CoO_2$ plane-gliding which can eventually result in structural instability during repeated charge and discharge cycling and could be responsible for the poor performances of $LiCoO_2$ in real commercial cells at higher voltages. In particular, several research groups have reported multiple failure mechanism of $LiCoO_2$ at high voltage including impedance growth in the cell, resulting from side reactions involving $LiPF_6$-based electrolytes and initial surface degradation of $LiCoO_2$ particles caused by air or moisture exposure, cobalt leaching and elution, possibly assisted by by-produced HF attack, formation of cubic spinel phase at the $Li_xCoO_2$ particles/electrolyte interface and an increase of dislocations and internal particle strains. These events result in poor safety, poor cycling stability at elevated voltage and poor storage properties of charged cathodes at elevated temperature.

On the other hand, increasing the particle size to increase the packing density impairs the power capability of rechargeable batteries. In order to meet the power requirements, the battery as a whole and particularly the active cathode material itself must have a sufficient high rate performance. Increasing the mean particle size reduces the solid-state lithium diffusion length, which eventually results in a lowered rate performance.

A careful study of published results of cathode materials allows to better understand the limitations of $LiCoO_2$ based rechargeable lithium batteries. A fundamental limitation of the state of the art $LiCoO_2$-based materials lies in the Li-excess and particle size dilemma. In WO2010-139404, the authors illustrate the relationship between packing density, mean particle size and lithium excess used for the preparation of state of the art Mg and Ti doped $LiCoO_2$. In short, the higher the packing density, the higher the particle size and the higher the Li-excess, expressed as Li:Co>>1.00—typically Li:Co is around 1.05—used for the synthesis. The mechanism is based on a so-called "lithium-flux effect" where the Li-excess acts as a flux enhancing the growth of $LiCoO_2$ particles which eventually increases the packing density. Typical packing densities of ca. 3.70 g/cm³ are achieved for 18 µm particles. Authors also emphasize that large pressed densities are preferable and obtained with monolithic, potato-shaped and non-agglomerated primary $LiCoO_2$ particles. The use of higher Li:Co excesses to achieve larger monolithic particles results however in poor electrochemical performances, with lower C-rate and lower discharge capacity, which in return cancels energy density gains achieved by increasing the particle size. Such large Li:Co values also increase pH, soluble base content and carbon content, which impairs safety, storage and bulging properties of charged cathodes. Levasseur, in Chem. Mater., 2002, 14, 3584-3590 establishes a clear relationship between the increase of structural defect concentrations, as evidenced by means of ⁷Li MAS NMR, and the increase of Li:Co excess.

As a consequence, current state of the art synthesis does not allow to achieve dense, monolithic $LiCoO_2$-based particles with reduced Li:Co excess. Partial improvements have been achieved but the above basic problems have not yet been fully resolved. Hence there is clearly a need for high capacity LiCoO$_2$ based cathodes which can be cycled in a stable manner in real cells at higher voltages.

In the prior art several approaches have been suggested to cope with this problem. To achieve high voltage stability, LiCoO$_2$ materials are usually coated (for example with Al$_2$O$_3$) or otherwise chemically modified (e.g. by providing a fluorinated surface). A problem is that coated dense LiCoO$_2$ often has a lower reversible capacity, so that a part of the gain of energy density by charging to higher voltage is annulled by a lower intrinsic capacity. This effect can be observed for aluminum oxide protective and LiF protective coatings, but similar effects are observed for other coating approaches such as ZrO$_2$, AlPO$_4$, etc . . . .

Studying the literature furthermore tells us that coating might not be necessary at all to achieve high voltage stability. Chen Et Dahn (Electrochem. Solid-State Lett., Volume 7, Issue 1, pp. A11-A14 (2004)) for example report that a freshly prepared LiCoO$_2$ could cycle in a stable manner at 4.5V if tested in coin cells with Li metal anodes. Such an approach might be correct for coin cells but the effect cannot be reproduced in real commercial cells. These results are confirmed by the fact that now, several years after that publication, special treated—and not pure—LiCoO$_2$ is commercially sold for high voltage applications.

Currently no other strategies are known which lead to high voltage performances. It is an object of the present invention to define a cathode material having a high packing density, high rate performance, improved discharge capacity and showing high stability during extended cycling at high charge voltage for high end secondary battery applications.

SUMMARY

Viewed from a first aspect, the invention can provide a lithium metal oxide powder for a cathode material in a rechargeable battery, the particles of the powder comprising a core material and a surface layer, the core having a layered crystal structure consisting of the elements Li, a metal M and oxygen, wherein the metal M has the formula M=Co$_{1-a}$M'$_a$, wherein M' is Al or M' is Al and either one or more of Ti, Mg, Ga and B; and the surface layer comprising Li, Co, and inorganic N-based oxides or lithiated oxides, wherein N is Al, Ti and Mg or N is Al, Ti, Mg and either one or more metals of the group consisting of Fe, Cu, Ca, Ba, Y, Sn, Sb, Na, Zn, Zr and Si, and wherein the molar ratios Mg:Co>0.004, Al:Co>0.004, and wherein the sum of Mg, Al and Ti molar contents in the core is less than the sum of Mg, Al and Ti molar contents in the surface layer. It may be that the particles of the powder consist of only the core and the surface layer. In this embodiment it may be that 0≤a≤0.05. In an embodiment the molar ratio Li:(Co+Al) is more than 0.98 and less than 1.01, or more than 0.985 and less than 1.005, or even between 0.99 and 1.00. In another embodiment the powder has a mean particle size D50 of at least 15 μm. The powder may also have a bimodal particle shape distribution where the small particle size fraction has a D50≥5 μm and is between 3 to 20 Vol %, and where the large particle size fraction has a D50≥15 μm. In an embodiment the density of a relaxed pellet is greater than 3.80 g/cm$^3$ after applying a pressure of 207 Mpa on the powder. In other embodiments:
- the thickness of the surface layer is 1 μm or less, and even 500 nm or less, or
- the Al content in the core is radially constant, and less than the Al content in the surface layer, or
- the Al:Co molar ratio in the surface layer is more than 2a/(1−a), or
- either one or more of the Mg:Co and Ti:Co molar ratios in the surface layer is more than 2 times, or even more than 5 times, the corresponding Mg:Co or Ti:Co molar ratios in the powder comprising core and shell, or
- the powder has a BET value lower than 0.3 m$^2$/g, or even less than 0.25 m$^2$/g, or
- the powder consists of monolithic, potato-shaped and non-agglomerated particles, or
- the molar ratios Mg:Co>0.009 and Al:Co>0.009, or
- each of the Mg and Ti contents in the core is less than each of the Mg and Ti contents in the surface layer.

In an embodiment the lithium metal oxide powder has an electrical conductivity less than 10$^{-5}$ S/cm, or even less than 10$^{-6}$ S/cm as measured under a pressure of 63.7 MPa at 25° C. In a different embodiment the onset time of gas generation in a sealed 1600 mAh state-of-the-art pouch cell having as positive active material said lithium metal based powder is at least 70 hrs, the cell being stored at 50° C. and subjected to a float-current voltage of 4.40 V. In different embodiments the lithium metal oxide powder has a capacity versus voltage differential ratio dQ/dV that is:
- less than 700 mAh/g/V in the 4.40V to 4.70V voltage range vs. Li metal during a first charge at C/10 rate, or
- less than 2000 mAh/g/V in the 4.51V to 4.70V voltage range vs. Li metal during a first discharge at C/10 rate.

In another embodiment the carbon content of the powder is less than 50 ppm, or even less than 25 ppm. It may also be that the soluble base content (SBC) of the powder is less than 25 μmol/g, or even less than 15 μmol/g.

Viewed from a second aspect, the invention can provide a cathode in an electrochemical cell comprising the lithium metal oxide powder described before.

DETAILED DESCRIPTION

Figure 1:
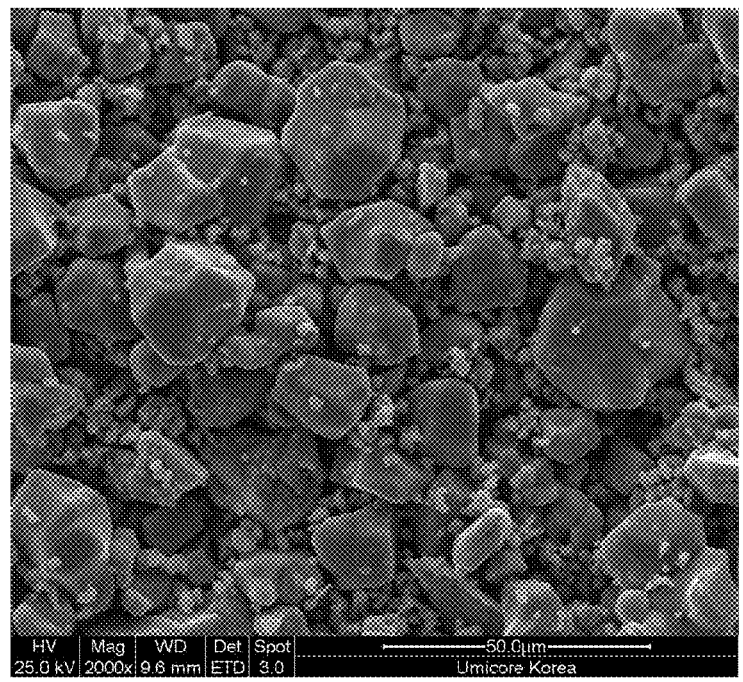
FIG. 1: Scanning electron microscope image of EX1 (1a) and EX3 (1b).
Figure 1:
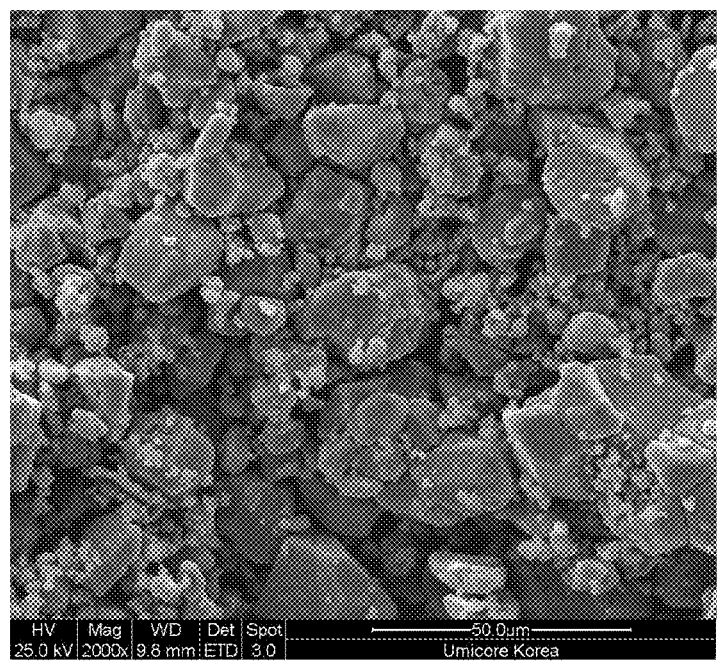

The materials disclosed in the present invention have an improved structural stability at high voltage, especially when charged up to 4.45V and 4.5V against a graphite anode in a full cell (or ~4.5V and ~4.55V against Li metal in a coin cell, respectively). In particular, it has been observed that the metal elution is dramatically suppressed when storage is performed at high voltage and elevated temperature, typically above 45° C. for several days. In this voltage range, conventional $Li_xCoO_2$ is expected to undergo a first order phase transition from O3 to H1,3. The presence of the O1 phase is not excluded in the vicinity of 4.55V vs. Li-metal. A careful study of the charge profile shows that the nature of the O3 to H1,3 transition is significantly affected for the materials of the present invention compared to conventional $LiCoO_2$-based materials. For example, in one embodiment, the O3 to H1,3 to O1 phase transitions during charge and discharge are impaired or suppressed and, as a consequence, the characteristic plateaus on the capacity-V plots and associated peaks on the dQ/dV-V plots of these transitions are decreased or not observed. Preventing the O3 to H1,3 to O1 phase transitions is particularly desirable as internal particle strain during repeated charge and discharge cycles is reduced and the structural stability at high voltage is improved.

The present invention discloses a cathode material having a high packing density, a high rate performance, improved discharge capacity and showing high stability during extended cycling at high charge voltage. This is achieved by a powderous lithium metal oxide comprising a core material consisting of the elements Li, the metal M and oxygen, wherein the Li content may be stoichiometrically controlled; and an electron-insulating surface layer consisting of a mixture of the elements of the core materials or inorganic N-based oxides or combination thereof, wherein N is either one or more metals of the group consisting of Mg, Ti, Fe, Cu, Ca, Ba, Y, Sn, Sb, Na, Zn, Zr and Si.

In one embodiment, the core of the material of the present invention has the formula $Li_{1.00\pm0.01}MO_2$ wherein M has the formula $M=Co_{1-a}M'_a$ with $0 \leq a \leq 0.05$, wherein M' is either one or more metals of the group consisting of Al, Ga and B and wherein the Li:M molar ratio is stoichiometrically controlled and between 0.98 and 1.01. In another embodiment the core material has a hexagonal layered crystal structure described as an ordered rock salt-type crystal structure with space group R-3m. The core may be substantially free of structural defects such as oxygen vacancies and Li substitution for M in the $MO_2$ layers, and also substantially free from paramagnetic metals such as $Co^{2+}$, intermediate spin $Co^{3+}$ and $Co^{4+}$. The existence of a defect-free core is an inherent feature of the cathode material of the actual invention. The inventors observe that a defect-free core, enabling faster diffusion of Li ions into the particles, is related to the high observed rate performance and improved discharge capacity of the disclosed cathode materials.

The surface layer has an inhomogeneous composition compared to the core with a compositional gradient of the different M, M'(particularly Al), Li and O elements. The surface is enriched of elements N such as Mg, Ti, Fe, Cu, Ca, Ba, Y, Sn, Sb, Na, Zn, Zr and Si and, in one embodiment, the surface layer is formed by segregation from the core and accumulation of these metal dopants at the surface of the particles. In the core, these dopants are substantially absent. The authors could not indisputably establish the chemical nature of the oxides formed at the surface and therefore speculate that, for example in the case of Mg, Si and Ti doping, possible forms are, but not limited to, $LiMO_2$, $MgO$, $CoO$, $Co_{1-\phi}Mg_\phi O$ with $\phi \leq 1$, $Co_3O_4$, $Mg_\delta Co_{3-\delta}O_4$ with $\delta \leq 1$, $TiO_2$, $Li_2TiO_3$, $SiO_2$, $Li_\epsilon Si_\lambda O_\pi$ with $2 \leq \epsilon \leq 8$, $1 \leq \lambda \leq 2$ and $3 \leq \pi \leq 7$ . . . . These assumptions are supported by the XPS experiments where the chemical shifts observed for Co, Mg and Ti are typical of oxygen environment and the low electrical conductivity of the particles as the above mentioned oxides are expected to be strong insulators. Where it is said that the surface layer consists of a mixture of the elements of the core material (Li, M, O) and inorganic N-based oxides, by "N-based" oxides are meant also those oxides incorporating Li atoms.

The surface is densely and continuously connected to the core and cannot be physically separated from the particle. Hence in another embodiment the concentration in N metals—with increasing distance from the surface—decreases, possibly in a gradient-like manner and approaches zero in the inside of the particles. The N-enriched surface of the particles features two additional and unexpected properties:
  (i) The surface is substantially free from lithium salts such as LiOH and $Li_2CO_3$. Such characteristic is particularly desirable in high density high voltage applications such as high-end polymer or prismatic cells as bulging and storage properties are considerably improved,
  (ii) Surprisingly, the N-enriched surface particles are also featuring electron-insulating properties. The authors speculate that the accumulation of oxidized N-based species is responsible for the low electronic conductivity and provides a physical separation from the electrolyte, further preventing undesirable side-reactions.

The surface layer is typically between 20 nm to 200 nm, and preferably between 20 nm and 100 nm thick, and is primarily affected by two parameters:
  (i) the N content: the thickness increases when the N-content increases.
  (ii) the particle size distribution of the powder materials. The lower the particle size for a given amount of N, the thinner the surface layer. A too thick layer is not desirable as it results in increased polarization and eventually in lower rate performance. Conversely, a too thin layer is also not advantageous as it will provide bad shielding against electrolyte and will be less efficient in preventing parasitic-reactions.

As initially said, an essential feature of $LiCoO_2$-based cathode materials is a high packing density, which allows increasing the energy density of commercial secondary batteries. In the present invention, a preferred morphology embodiment to achieve high packing density consists in monolithic, potato-shaped and non-agglomerated particles. A monolithic particle does not exhibit inner porosity, and it does not consist of agglomerates of smaller primary particles. A typical particle size (D50) is a least 5 μm or even at least 10 μm, and preferably above 15 μm. The pressed density is typically in the range of over 3.40 g/cm³ and preferably at least 3.70 g/cm³. In one embodiment, the pressed density is as high as 3.90 g/cm³. In another embodiment the pressed density is at least 3.40 g/cm³ for a powder with an average particle size above 6 μm. In still another embodiment the pressed density is at least 3.75 g/cm³ for a powder with an average particle size above 15 μm.

A process for manufacturing the high-density and high stability compounds of the present invention runs as follows:
  (i) providing a first mixture of a first metal M-comprising and a first Li-comprising precursor powder, the first mixture having a Li to metal molar ratio >1.01 or even between 1.05 and 1.10, in particular between 1.07 and 1.09,
  (ii) sintering this mixture in an oxygen comprising atmosphere at a temperature $T_1$ of at least 600° C., thereby obtaining a Li-enriched lithium metal oxide compound;
  (iii) providing a second M-comprising precursor powder, (iv) mixing the Li-enriched lithium metal oxide compound and the second M-comprising precursor powder into a second mixture, wherein a second Li-comprising precursor powder may be mixed, whereby the molar ratio of Li:M in the mixture is adjusted to 1.00±0.01, and (v) sintering the second mixture in an oxygen comprising atmosphere at a temperature $T_2$ of at least 600° C. In one particular embodiment, the metal M=Co.

Different implementations of the actual invention are possible, especially regarding the process conditions, the nature of the different precursors and their sequence of blending.

The first M-comprising precursor and second M-comprising precursor can be a mixture of cobalt containing precursor and M' containing precursor. Examples of suitable cobalt containing precursors include cobalt oxide, hydroxide, oxyhydroxide, carbonate and oxalate. The M' containing precursor can be an oxide, hydroxide or organic complex, preferably having sub-micrometric powderous morphology in order to achieve homogeneous distribution and easy blending process.

In several embodiments, either one or both of the first M-, the second M- and the first Li-comprising precursor powders further comprise at least one dopant (M' or N) from the group consisting of Al, Mg, Fe, Cu, Ti, Ca, Ba, Y, B, Sn, Sb, Na, Ga, Zn, F, P, S, and Zr. In one of these embodiments, either one or both of the first M- and the first Li-comprising precursor powders further comprise at least one element of the group consisting of Mg, Fe, Cu, Ti, Ca, Ba, Y, Sn, Sb, Na, Zn, Zr, F, P, S and Si. A homogeneous distribution of N dopant elements is important and can be improved by using this process embodiment. In an alternative process embodiment, the homogeneous dispersion of N dopants is improved when the second M-comprising precursor powder further comprises at least one element of the N dopant element group consisting of Mg, Fe, Cu, Ti, Ca, Ba, Y, Sn, Sb, Na, Zn, Zr and Si. Examples of suitable compounds comprising N elements are oxides (such as MgO, $TiO_2$, $SiO_2$, . . . ), fluorites (such as $MgF_2$ . . . ) with sub-micrometric particle size.

In one particular embodiment, Ti, Al and Mg, preferably in the form of $TiO_2$, $Al_2O_3$ and MgO particles with a D50 of respectively less than 100 nm, and less than 1 µm, are added to either one or both of the first and second mixtures described above. In another embodiment, Al, preferably in the form of $Al_2O_3$ particles with a D50 of less than 100 nm is added to the second mixture described above. In another particular embodiment the Li-enriched lithium metal oxide compound is $LiCoO_2$ with dense monolithic particles of at least 5 and preferably at least 10 to 20 micrometers. Many commercial prior art $LiCoO_2$ materials already have this desired morphology.

In yet another particular embodiment the second M comprising precursor features a particle size distribution with a D50 of less than ⅓, preferably less than ¼ of the D50 of the Li-enriched lithium metal oxide compound. In one embodiment, the size ratio between the second M comprising precursor and the Li-enriched lithium metal oxide compound is ⅙. In the latter case and after the second firing, a bimodal distribution is obtained wherein the $LiMO_2$-based particles originating from the second M comprising precursor are small enough to (a) support a very high C rate and (b) fit nicely in the voids of the larger lithium metal oxide particles packing, which allows for low porosity electrodes and a high volumetric energy density.

The Li-enriched lithium metal oxide compound obtained after the first sintering step, is further characterized by:

an NMR signal containing at least 2 contributions,
large amounts of lithium salts and carbon at the surface of the particles,
an electric conductivity higher than $10^{-4}$ $S/cm^2$,
poor electrochemical performances, namely low C-rate and low discharge capacity.

On the contrary, by finely controlling the lithium stoichiometry, the cathode materials of the present invention, obtained after the second sintering step, are characterized by: —a unique NMR contribution centered around 0 ppm,
extremely low amounts of lithium salts and carbon at the surface of the particles,
an electric conductivity lower than $10^{-5}$ S/cm,
improved electrochemical performances, namely high C-rate and high discharge capacity.

The Li content of the materials of the present invention is stoichiometrically controlled meaning that the Li:M molar ratio is in the range of 0.98-1.01. Authors have observed that if the targeted Li:M is above 1.01, then the electrochemical performances, such as lower discharge capacity and lower high voltage stability, and physical properties such as an increase of base content and carbon content, of the resulting material are inferior. Likewise, if the targeted Li:M is below 0.98, then the materials, though retaining a very good high voltage stability, undergo two undesirable effects: (i) less active material is available and the discharge capacity is lowered, and, (ii) a surface enriched in cobalt-based spinel is formed at the surface of particles, which increases the cell polarization.

The inventors have made two surprising observations, which are believed to be positive aspects of the invention:

First observation: The core of the particles is lithium stoichiometric or near stoichiometric and is substantially free from defects. The lithium metal oxide according to the present invention shows electrochemical properties different from those of lithium metal oxides, which are prepared according to state of the art methods, and which contain the same components as the lithium metal oxide of the present invention. This change in physical properties can be observed by $^7$Li-NMR. In $^7$Li-NMR, when a strong magnetic field is externally applied to a lithium-containing material, Li chemical shift values will be shifted due to various hyperfine interactions between a lithium nucleus having a nuclear magnetic moment and the unpaired electrons of metal components contained in the lithium-containing material. The local structural and electronic characteristics of a specific component in the crystal structure of the lithium-containing material can be assessed by measuring the different contributions to the $^7$Li NMR spectrum caused by such chemical shift values.

Second observation: When dopants N are present, the surface is formed during the second sintering by spontaneous segregation of the dopants from the core. The exact mechanism of this "in-situ" coating is unknown but the authors assume that it is privileged when the lithium stoichiometry is finely controlled and Li:M molar ratio between 0.98 and 1.01. In this case a cooperative reaction occurs where the core of the particle becomes lithium stoichiometric and N dopants such as Mg and Ti are expelled and accumulated at the surface of the particles. As mentioned above, this can be corroborated by NMR observations.

Linked to this, another important feature of the cathode materials of the present invention is their "insulating" nature. These cathode materials have conductivities which are at least 2-3 orders lower than those of the least conductive currently known cathode material. For example, commercial $LiCoO_2$ has a relatively high electrical conductivity in the range of $10^{-2}$ to 1 S/cm (as is discussed in US2012/0107691 A1). That the insulating cathodes according to the present invention can yield excellent electrochemical performance, namely a large discharge capacity and C-rate performance, is a surprise because it is commonly accepted that a high electrical conductivity is needed for the $Li^+$ cation diffusion within the solid cathode and across the interface between electrolyte and cathode.

It is believed that the low conductivity provided by the surface layer is the main reason for the high voltage stability of the cathode materials of the present invention. When a $LiCoO_2$-based cathode is charged to high voltage—meaning the cathode is strongly deintercalated—we achieve a $Li_x$-$CoO_2$ ($x\ll1$) composition where most of the cobalt ions are in the 4+ valence state. Tetravalent-cobalt containing $Li_x$-$CoO_2$ is a very strong oxidizer and is highly reactive. The electrolyte becomes thermodynamically unstable when in contact with such an oxidizing surface. A reaction with the electrolyte (being the reducing agent) is strongly preferred energetically. Even at low temperature—during normal cycling of a $LiCoO_2$ cathode at high voltage—this reaction proceeds slowly but continuously. Reaction products cover the cathode surface and the electrolyte is decomposed, and both effects continuously cause a deterioration of the electrochemical performance of the battery. Also, a loss of capacity and a strong increase of resistance—by polarization—is observed.

Obviously, a cathode material protected by an insulating surface layer will solve this problem by physically separating tetravalent cobalt ions from the electrolyte and eventually preventing further electrolyte reduction. By careful selection of the compounds, such as Mg, Zr, Si and Ti, the process allows to achieve an in-situ coating of the final powder with a layer that is enriched in oxidized compounds, like MgO and $TiO_2$, that may also be lithiated. This inert coating layer provides additional safety when the powders are in contact with the electrolyte of the battery.

The invention may be practiced by way of the different examples described below.

Example 1

Preparation of a Mg- and Ti-doped Li-excess $LiCoO_2$-based core: lithium carbonate, tricobalt tetroxide, magnesium carbonate and titanium oxide are mixed in a molar ratio of 1.10/0.995/0.0025/0.0025 using a pilot scale equipment. 3.2 kg of the mixture is put in a 5.9 L mullite sagger and fired at 980° C. for 12 h in an air flow of 4 $m^3$/kg. The sintered cake is milled and classified. The powderous materials has an average particle size D50 of about 16.6 μm and a D100 of about 60.1 μm. The composition, determined by ICP, is $Li_{1.07}Co_{0.9951}Mg_{0.0024}Ti_{0.0025}O_{2\pm\delta}$. Some departure from the oxygen stoichiometry "δ≤0.2" is possible but has not been precisely characterized in the present case. This sample is labelled as LCO-1 in the following.

Preparation of EX1, 2 and 3: Li-stoichiometrically controlled layered lithium cobalt oxide particles with complex Mg, Al and Ti spatial distribution are prepared: a precursor blend pEX1 is prepared by mixing LCO-1, $Co_3O_4$, MgO, $Al_2O_3$, $TiO_2$ and $Li_2CO_3$ powders as follows: LCO-1 and $Co_3O_4$ (with D50=3 μm, commercially available from Umicore) are introduced in a cobalt molar fraction of Co(LCO-1)/Co($Co_3O_4$)=89.96%/13.04%. MgO, $Al_2O_3$ and $TiO_2$ powders are added to the mixture to achieve a molar content of 0.35%/0.18%/0.28% vs. total Co (in LCO-1 and $Co_3O_4$). $Li_2CO_3$ is introduced to precisely control the Li stoichiometry to achieve a molar ratio of Li/(Co+Al)=1.000. The metal composition, determined by ICP, is $Co_{0.9914}Mg_{0.0032}Ti_{0.0028}Al_{0.0026}$ and the Li/(Co+Al)=0.993; both ratios are is in close agreement with the expected composition.

A precursor blend pEX2 is prepared in a similar fashion as pEX1, expect that MgO, $Al_2O_3$ and $TiO_2$ powders are added to the mixture to achieve a molar content of 0.5%/0.5%/0.283% vs. total Co (in LCO-1 and $Co_3O_4$). $Li_2CO_3$ is introduced to precisely control the Li stoichiometry to achieve a molar ratio of Li/(Co+Al)=1.000. The metal composition, determined by ICP, is $Co_{0.9867}Mg_{0.0048}Ti_{0.0028}Al_{0.0057}$ and the Li/(Co+Al)=0.994; both ratio are in close agreement with the expected composition.

pEX3 blend is prepared in a similar fashion as EX1, expect that MgO, $Al_2O_3$ and $TiO_2$ powders are added to the mixture to achieve a molar content of 1.0%/1.0%/0.283% vs. total Co (in LCO-1 and $Co_3O_4$). $Li_2CO_3$ is introduced to precisely control the Li stoichiometry to achieve a molar ratio of Li/(Co+Al)=1.000. The metal composition, determined by ICP, is $Co_{0.9775}Mg_{0.0094}Ti_{0.0027}Al_{0.0057}$ and the Li/(Co+Al)=0.998; both ratios are in close agreement with the expected composition.

pEX1, 2 and 3 are put in a ceramic crucible and fired at 980° C. in air for 10 h in a box-type furnace to produce the lithiated and fired blends EX1, 2 and 3. The furnace is then naturally cooled down to room temperature at a rate of −5K/min. The black sintered powder is ground and sieved using a 270-mesh sieve. The mean D50 particle size in volume of EX1, 2 and 3 are typically ranging between 16 to 17 μm. The product are stored in sealed laminated bags to protect from moisture uptake and subsequent degradation. The compositions, as determined by ICP, are:

EX1: $Li_{0.987}Co^{0.9914}Mg_{0.0032}Ti_{0.0028}Al_{0.0026}O_{2\pm\delta}$

EX2: $Li_{0.986}Co_{0.9867}Mg_{0.0048}Ti_{0.0028}Al_{0.0057}O_{2\pm\delta}$

EX3: $Li_{0.985}Co_{0.9775}Mg_{0.0094}Ti_{0.0027}Al_{0.0104}O_{2\pm\delta}$, when the sum of Co and the doping metals is normalized and equal to 1. These values are very close to the nominal compositions and indicate very good Li-stoichiometry and dopant control during the preparation of these materials.

SEM: Scanning electron images of EX1 and EX3 powders are shown on FIGS. 1a and 1b, respectively. The powders comprise very dense and monolithic large particles originating from LCO-1, and finer particles originating from the added $Co_3O_4$ fraction. Such bimodal morphology is particularly desirable in order to achieve a large packing density and eventually a larger electrode density.

Packing density: the density of the powderous materials is determined as follows: 3 grams of powder is filled into a pellet die with a diameter "d" of 1.300 cm. A uniaxial load of 2.8 tons, corresponding to a pressure of 207 MPa, is applied for 30 seconds. After relaxing the load down to 7.4 MPa (100 kg uniaxial load), the thickness "t" of the pressed powder is measured. The pellet density is then calculated as follows: $3/(\pi\times(d/2)^2\times t)$ in g/$cm^3$. LCO-1 has a pellet density of 3.80 g/$cm^3$. EX1, EX2 and EX3 respectively have a pellet density of 3.94, 3.90 and 3.86 g/$cm^3$. The enhanced packing density of EX1, EX2 and EX3 vs. LCO-1 is originating from a particular modification of the particle size distribution; namely the introduction of a bimodal feature in order to fill interstitial sites between large LCO-1 particles with smaller particles and hence to increase of packing density. It is well known in crystallography that, assuming a uniform and ideal close packing of spherical particles with radius "r"; octahedral, tetrahedral and trigonal interstitial sites are only accessible to finer particles with a maximum radius of 0.414×r1, 0.225×r2 and 0.155×r3, respectively. Applying such considerations to samples EX1, EX2 and EX3; being a mixture of large particles (originating from LCO-1) with about 16~17 μm radius and finer particles (originating from $Co_3O_4$) with about 3 μm radius; all of octahedral, tetrahedral and trigonal interstitial sites—with radius of r1=6.9, r2=3.7 and r3=2.6 μm respectively—are accessible. As a result filling of interstitial sites allows to achieve larger packing densities for samples EX1, EX2 and EX3, compared to LCO-1.

The Brunauer-Emmett-Teller (BET) surface area is measured for EX1, 2 and 3. The BET is found to be 0.22 m²/g, 0.23 m²/g and 0.24 m²/g, respectively.

The residual $Li_2CO_3$ and LiOH base content is a material surface property that can be quantitatively measured by the analysis of reaction products between the surface and water. If powder is immersed into water a surface reaction occurs. During the reaction the pH of the water increases (as basic compounds dissolve) and the base is quantified by a pH titration. The result of the titration is the "soluble base content" (SBC). The content of soluble base can be measured as follows: 100 ml of de-ionized water is added to 20 g of cathode powder, followed by stirring for 10 minutes. Care is taken to prevent air exposure by closing the flask during the stirring period, as $CO_2$ uptake from the air can happen and falsify the result. The aqueous solution is then removed by using Buchner filtration with suction, thereby achieving >90 g of clear solution which contains the soluble base. The content of soluble base is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau with endpoint $\gamma_1$ (in mL) between pH 8~9 is $OH^-/H_2O$ followed by $CO_3^{2-}/HCO_3^-$, the lower plateau with endpoint $\gamma_2$ (in mL) between pH 4~6 is $HCO_3^-/H_2CO_3$. The inflection point between the first and second plateau $\gamma_1$ as well as the inflection point after the second plateau $\gamma_2$ are obtained from the corresponding minima of the derivative dpH/dVol of the pH profile. The second inflection point generally is near to pH 4.7. Results are then expressed in LiOH and $Li_2CO_3$ weight percent and for SBC in μmol/g. The LiOH wt % content is found to be 0.0095 wt %, 0.0070 wt % and 0.0089 wt % for EX1, EX2 and EX3, respectively. The $Li_2CO_3$ wt % content is found to be 0.0053 wt %, 0.0077 wt % and 0.0057 wt % for EX1, EX2 and EX3, respectively. The SBC content is found to be 5.4 μmol/g, 5.0 μmol/g and 5.3 μmol/g for EX1, EX2 and EX3, respectively. The present invention is best practiced when the $Li_2CO_3$ wt % and SBC content are below 0.02 wt % and 25 μmol/g, respectively, and preferably below 0.010 wt % and 15 μmol/g.

The carbon content is measured on a Leco Carbon/Sulfur equipment using combustion infrared detection technique. The carbon content is found to be 5 ppm, 19 ppm and 23 ppm for EX1, EX2 and EX3, respectively. The present invention is best practiced when the C is below 50 ppm and most preferably below 25 ppm.

Figure 2:
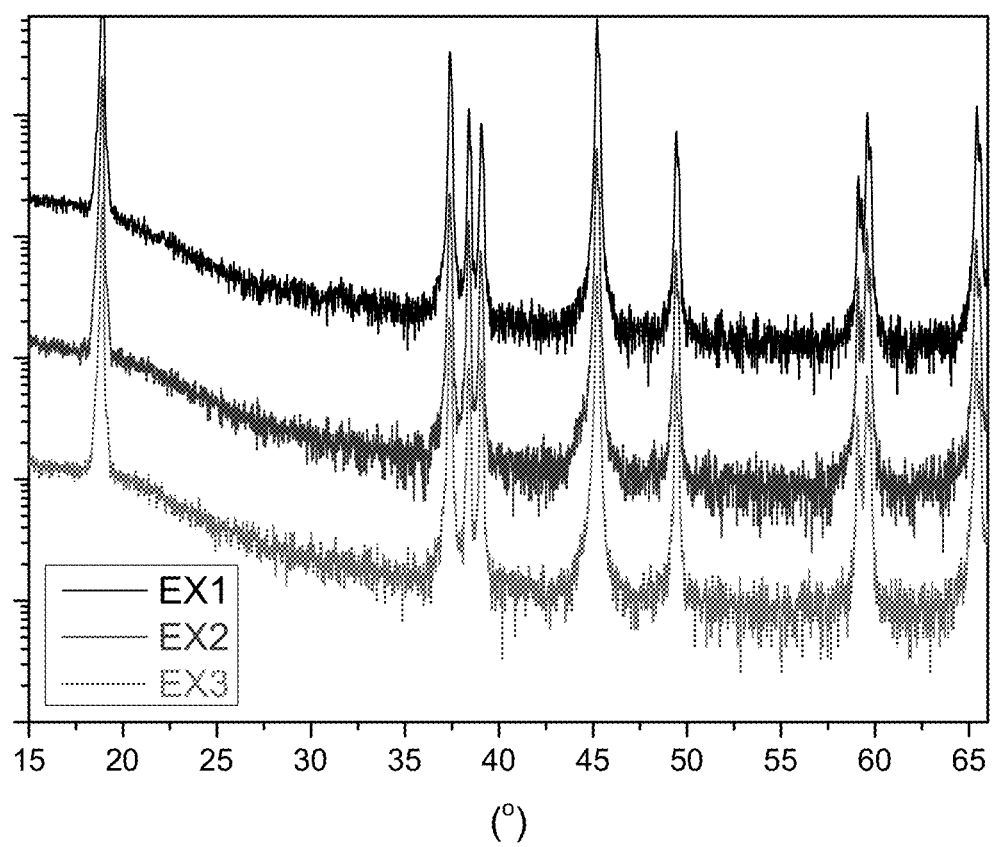
FIG. 2: XRD pattern of EX1, 2 and 3: diffracted intensity (arbitrary units) is plotted in logarithmic scale as function of diffracted angle 2θ (in degrees).

XRD: XRD patterns of samples EX1, 2 and 3 are displayed on FIG. 2 (top to bottom: EX1, EX2, EX3). All samples have an ordered hexagonal layered O3-type structure described by space group R-3m (166) with a ~2.817 Å and c ~14.06 Å. No impurities such as Co-based cubic oxides or unreacted Li-salts are found, meaning that the Li-stoichiometry has been precisely controlled. Possible occurrence of cubic-like impurities such as $Co_3O_4$ or CoO or "spinelization" of the surface of the particle (for example from a defect such as metal ions occupying Li-sites) is not excluded and is beyond the spatial resolution and sensitivity of the present XRD diffraction experiments. Techniques such as high resolution TEM or STEM are better suited to investigate such configurations.

XPS: XPS measurements are carried out in a Quantera SXM™ from ULVAC-PHI (Q2). The measurements are performed using monochromatic AlKα-radiation and a spot size of 100 μm (100 Watt) scanning across an area of 1200×500 μm². The measurement angle 0 is 45°; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, $V_i$=4 kV, raster 3×3 mm², sputter rate in $SiO_2$: 8 nm/minute—in other materials the sputter rate will be different). Standard sensitivity factors are used to convert peak areas to atomic concentrations. As a result, it is possible that the concentrations deviates from reality in the absolute sense. In sputter depth profiles deviations might be larger due to preferential sputtering effects. The detection limit of the different elements is typically 0.1 at %; meaning that elements with atomic concentration below 0.1 at % will not be observed by means of XPS, and their presence with concentrations <0.1 at % cannot be excluded.

The chemical compositions of the top surfaces of the particles (the information depth being approximately 7 nm) of EX2 and EX3 have been investigated by means of XPS. The quantitative results for EX2 and EX3 are listed in Table 1. In the second row of the Table, the approximate peak positions (binding energy in eV) are given. Surface measurements have been performed on two powder positions marked #1 and #2. The at % results at the duplicate positions #1 and #2 are in good agreement for each sample.

TABLE 1

Detected elements and apparent atomic concentrations (in at %) measured at the surface of EX2 and EX3 powder.

| Sample | Position (eV) | Al 2s 117.9 | C 1s 284.8 | Co 2p1 795.3 | Li 1s 54.4 | Mg 2p 49.7 | Na 1s 1072 | O 1s 532 | S 2p 169.1 | Ti 2p 458.2 |
|---|---|---|---|---|---|---|---|---|---|---|
| EX2 | #1 (at %) | 0.3 | 6.9 | 10.4 | 13.9 | 2.6 | 2.7 | 25.9 | 0.5 | 1.9 |
| EX2 | #2 (at %) | 0.2 | 7.0 | 10.3 | 13.1 | 3.0 | 3.2 | 26.2 | 0.5 | 1.9 |
| EX3 | #1 (at %) | 0.3 | 11 | 11 | 11.5 | 3.6 | 1.8 | 59 | 0.8 | 1.5 |
| EX3 | #2 (at %) | 0.3 | 12 | 12 | 7.1 | 2.1 | 1.8 | 62 | 0.9 | 1.7 |

The main observations are as follows:

One carbon 1s peak position is found at ~285 eV and is assigned to the organic $C_xH_y$ environment. This C 1s signal is characteristic for samples that are exposed to ambient air.

A very strong Ti 2p signal at 458 eV is found, suggesting the exclusive presence of $Ti^{4+}$ in six-fold oxygen environments. Possible host structures for $Ti^{4+}$ in the present systems are—and are not limited to —$TiO_2$, $Li_2TiO_3$ . . . . The Ti:Co ratios measured at the very surface of EX2 and EX3 are close to 0.1~0.2, which is more than 50 times the Ti:Co blend ratio (ca. 0.0028).

A Mg 2p XPS peak around 50 eV is observed for both samples. The Mg:Co ratio measured by XPS is at least about 20 times higher than the expected Mg:Co blend ratio (ca. 0.005 for EX2 and 0.01 for EX3).

Lastly, an Al 2p signal at ~118 eV is measured and likewise, the Al:Co ratio measured for both samples exceeds the blend ratio by a factor 3 (for EX3) to 6 (for EX2).

Figure 3:
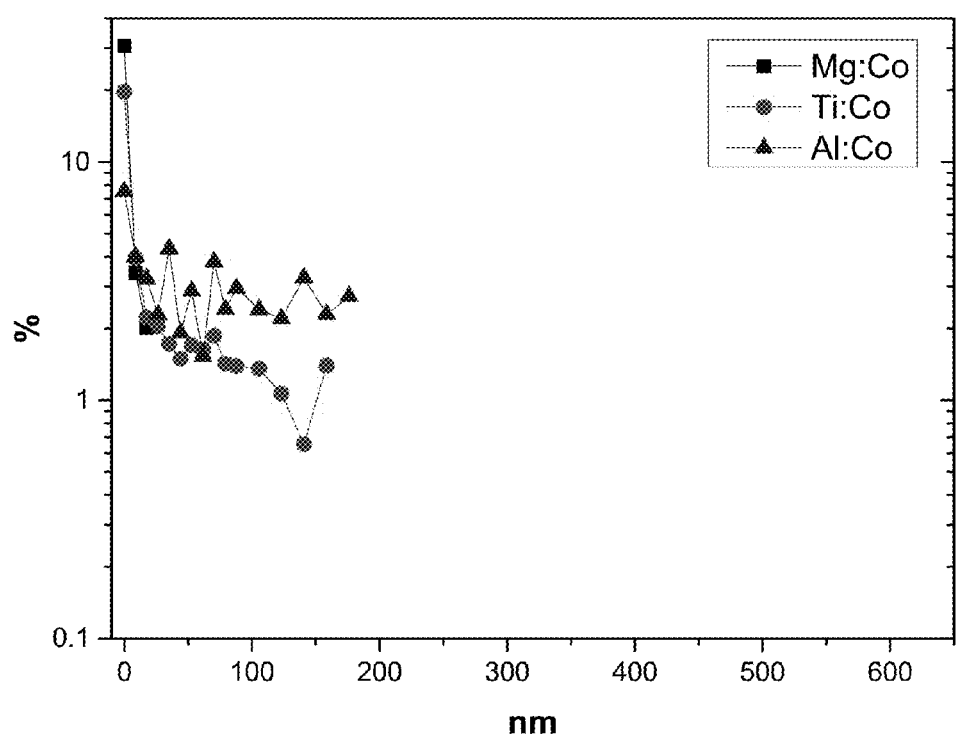
FIG. 3: XPS depth-profile showing the evolution of Mg:Co, Ti:Co and Al:Co molar ratio (in %) in Log$_{10}$, scale as function of sputter depth (in nm vs. SiO$_2$) for sample EX2.
Figure 4:
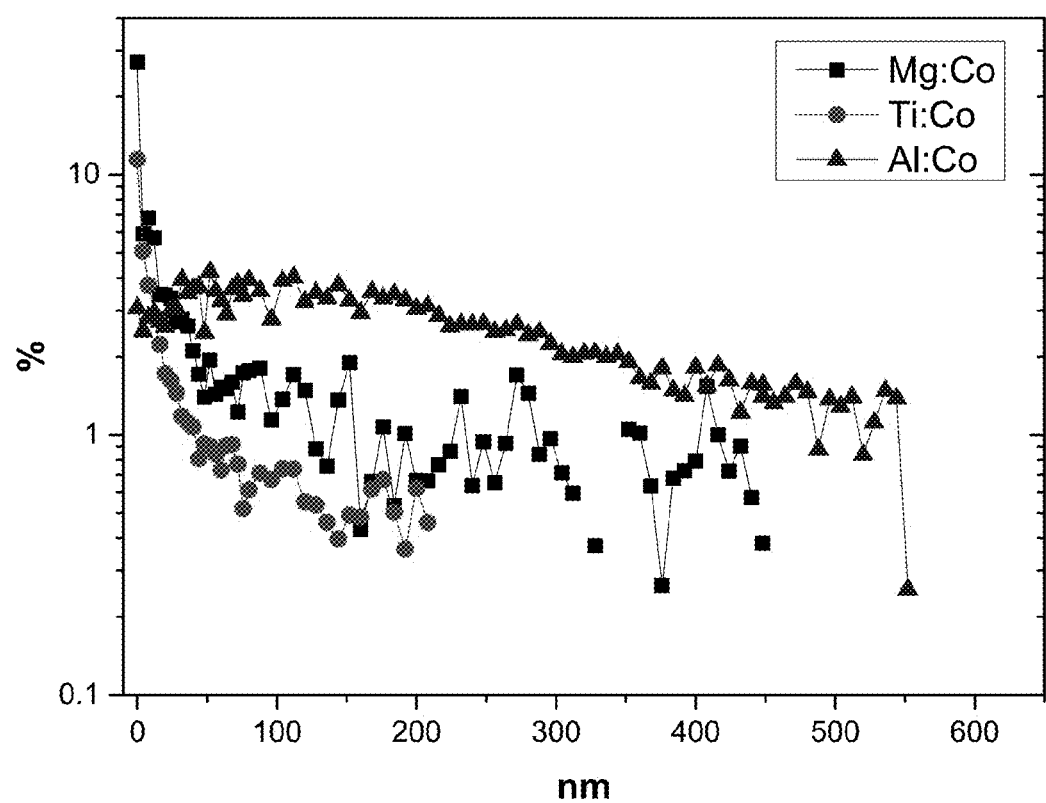
FIG. 4: XPS depth-profile showing the evolution of Mg:Co, Ti:Co and Al:Co molar ratio (in %) in Log$_{10}$, scale as function of sputter depth (in nm vs. SiO$_2$) for sample EX3.

In order to clarify the spatial distribution of Mg, Ti and Al elements within the particles, XPS depth profiling is carried out. FIG. 3 shows the evolution of Mg:Co, Ti:Co and Al:Co molar ratio (in %) as a function of depth (vs. $SiO_2$) for EX2. FIG. 4 shows the evolution of Mg:Co, Ti:Co and Al:Co molar ratio (in %) as function of depth (vs. $SiO_2$) for EX3. Sputtering has been carried out up to a depth of about 500 nm vs. $SiO_2$. Where "null" values are not shown on the $Log_{10}$-scale, this indicates that the element is not present, or, that the at % content of the species falls below the detection limit of the XPS equipment. The latter remark means that the presence of either one or more of Mg, Ti and Al in the core cannot be excluded and (i) they are present in amounts below XPS detection limit and (ii) they are in lower atomic ratios vs. Co than in the surface layer.

For both EX2 and EX3, the Ti:Co ratio has an exponential decay with sputtering depth, indicating that Ti is segregated and accumulated at the surface of the EX2 and EX3 particles. The Ti content falls below the detection limit of XPS at depths greater than d ~200 nm vs. $SiO_2$. Also, Al:Co ratio is very high up to a depth of d ~100 nm vs. $SiO_2$ with more than 3 to 6 times the expected blend ration values of ca. 0.005 for EX2 and 0.01 for EX3. For depth greater than 100 nm, the Al:Co decreases rapidly for both samples, suggesting that an Al-enriched surface is formed. Likewise, the Mg:Co ratio exponentially decreases for EX2 and EX3 suggesting that Mg segregates and accumulates at the surface of the particles in a gradient-like distribution profile. Mg is detected up to a depth of 20 nm for EX2 and 450 nm for EX3 and then falls below the detection limit of XPS a larger depth. In the following, the surface layer is defined as the radial particle depth where either one or more of the Mg, Ti and Al atomic ratios vs. Co is more than 2 times the atomic ratio in the powder (=core+surface layer). In the surface layer the Mg, Ti and Al atomic ratios vs. Co are preferably more than 5 times the atomic ratios in the powder. From the measurements of Al, Ti and Mg, it is clear that the XPS depth profile enables to determine the thickness of the surface layer as being 500 nm or less.

Figure 5:
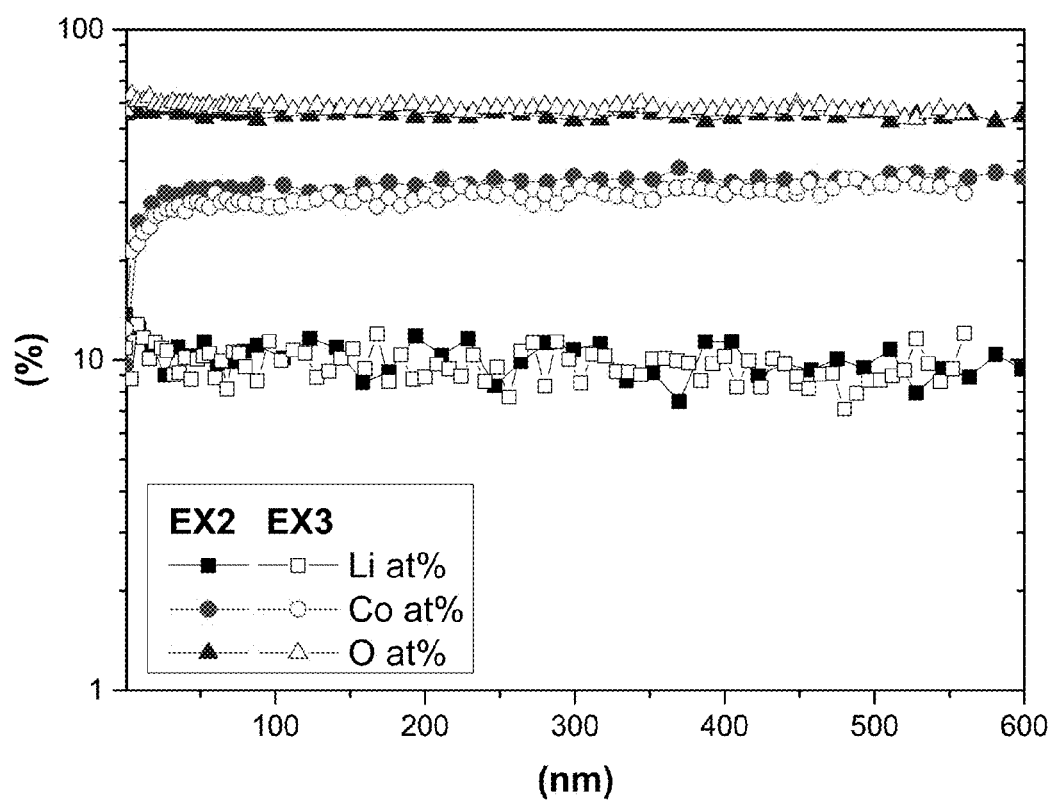
FIG. 5: XPS depth-profile showing the evolution of Li at %, Co at % and O at % atomic contents (in at %) for samples EX2 (solid symbols) and EX3 (open symbols).

FIG. 5 shows the XPS depth-profiles of Li at %, Co at % and O at % (in at %) for samples EX2 (solid symbols) and EX3 (open symbols). For both samples, the Li at %, Co at % and O at % converge to 10, 35 and 60 at %, respectively.

These experimental values deviate from the expected atomic contents of 25, 25 and 50 at % for $LiCoO_2$-based materials. Such deviation is presumably originating from the preferential supporting effect and also from the standard sensitivity factors that were used to convert peak areas to atomic concentrations as detailed in [Wagner et al., Surf. Interface Anal. 3, 211 (1981)] and in [Moulder et al., Handbook of X-ray Photoelectron Spectroscopy, edited by J. Chastain Perkin-Elmer Corporation, Eden Prairie, (1992)]. As a result of this, it is possible that the concentrations deviate from reality in the absolute sense, this is generally about 20% relative content.

Electrical conductivity: the electrical conductivity is measured on a Mitsubishi MCP-PD51 powder resistivity measurement system equipped with a Loresta GP MCP-T610 multi-meter in the 4-probe configuration. The measurement is carried out on powderous cathode materials under an applied pressure of 63.7 MPa. The conductivity is measured to be $3.70 \times 10^{-5}$ S/cm, $1.54 \times 10^{-6}$ S/cm and $2.02 \times 10^{-8}$ S/cm for EX1, EX2 and EX3, respectively. The very low conductivity of the samples compared to the usual values reported for $LiCoO_2$ in the range of $10^{-2}$ to 1 S/cm at room temperature is desirable in order to inhibit parasitic reactions with electrolyte and achieve superior electrochemical stability. The mechanism to account for such low conductivity decrease is believed to be linked to the increase in Al and Mg dopants and controlled dopant distribution at the surface of the particles.

Electrochemical performances are tested in CR2032 coin type cells, with a Li foil as counter electrode in a lithium hexafluorite ($LiPF_6$) type electrolyte at 25° C. The active material loading is 10.5 (±0.5) mg/cm$^2$. Cells are charged to 4.3V and discharged to 3.0V to measure rate performance and capacity. The high voltage discharge capacity and capacity retentions during extended cycling are measured at 4.6V charge voltages, according to the scheme in Table 2. A specific capacity of 160 mAh/g is chosen for the determination of the discharge rates. For example, for the discharge at 2 C, a specific current of 320 mA/g is used. Table 3 shows selected electrochemical properties for CEX1 and EX1. DQ7 refers to the discharge capacity between 4.6V and 3.0V at 0.1 C (with 1 C current of 160 mA/g) at cycle 7, in agreement with the coincell schedule given on Table 2. Energy fadings at 0.1 C and 1 C are calculated as follows and are expressed in % per 100 cycles.

$$0.1C\ EFad. = \left(1 - \frac{DQ31 \times \overline{V31}}{CQ7 \times \overline{V7}}\right) \times \frac{10000}{23} \text{ in } \%/100 \text{ cycles,}$$

$$1C\ EFad. = \left(1 - \frac{DQ32 \times \overline{V32}}{CQ8 \times \overline{V8}}\right) \times \frac{10000}{23} \text{ in } \%/100 \text{ cycles.}$$

where DQn is the discharge capacity at cycle n and Vn is the average voltage at cycle n. Because of the presence of clear H1,3 and O1 transition plateaus, the DQ7 capacity of CEX1 is superior to EX1 by about 6 mAh/g. The CQ, DQ and Qirr. values at 4.7V are also given in Table 3.

TABLE 2 schedule of coin cell electrochemical testing at 4.6 V vs. Li-metal.

| | | Charge | | | | Discharge | | | |
|---|---|---|---|---|---|---|---|---|---|
| Type | Cycle number "n" | C Rate | End Current | Rest (min) | V/Li metal (V) | C Rate | End Current | Rest (min) | V/Li metal (V) |
| Part 1: | 1 | 0.10 | — | 30 | 4.3 | 0.10 | — | 30 | 3.0 |
| Rate | 2 | 0.25 | 0.05 C | 10 | 4.3 | 0.20 | — | 10 | 3.0 |
| performance | 3 | 0.25 | 0.05 C | 10 | 4.3 | 0.50 | — | 10 | 3.0 |
| 4.3 V~3.0 V | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II: | 7 | 0.25 | 0.1 C | 10 | 4.6 | 0.10 | — | 10 | 3.0 |
| 1 C cycle | 8 | 0.25 | 0.1 C | 10 | 4.6 | 1.00 | — | 10 | 3.0 |
| life | 9~30 | 0.25 | — | 10 | 4.6 | 0.50 | — | 10 | 3.0 |
| 4.6 V~3.0 V | 31 | 0.25 | 0.1 C | 10 | 4.6 | 0.10 | — | 10 | 3.0 |
| | 32 | 0.25 | 0.1 C | 10 | 4.6 | 1.00 | — | 10 | 3.0 |

TABLE 3 electrochemical properties at 4.6 V and 4.7 V vs. Li-metal of EX1 and EX3.

| | DQ7 (mAh/g) | QFad._1C (%) | EFad._1C (%) | 4.7 V CQ (mAh/g) | 4.7 V DQ (mAh/g) | 4.7 V QIrr. (%) |
|---|---|---|---|---|---|---|
| EX1 | 225.3 | 51.5 | 60.6 | 260.6 | 254.5 | 2.4% |
| EX3 | 218.9 | 59.9 | 58.8 | 247.2 | 238.0 | 3.7% |

Float storage method: in a recent technical report of commercially available "3M battery electrolyte HQ-115", a float charging method is used to test the stability of novel electrolytes at high voltage. The method is carried out by continuously charging LCO/graphite pouch cells or 18650 cells at 4.2 V and 60° C. for 900 hours. The currents recorded under charge are compared. A higher current reflects more side reactions that occur, so this method is able to identify parasite reactions occurring in a battery at high voltage. In "*Energy Environ. Sci.*, 6, 1806 (2013)", a similar float charging method is used to evaluate the stability of an electrolyte against oxidation under high voltage from 5V and up to 6.3V vs. Li metal. Based on the above knowledge, by choosing a relatively stable electrolyte and anode materials for the required charging voltage, float charge methods can be used to study the stability of cathode materials under high voltage, where the metal dissolution of the cathode materials can be reflected by the leakage current. In addition, in "*Nature Comm.*, 4, 2437 (2013)", the dissolved manganese from a lithium manganese oxide cathode is deposited on the surface of the anode in metal or metal alloy form, and the deposited amount can be detected by inductively coupled plasma-atomic absorption spectrometry ICP-AAS, or by ICP-OES. These ICP experiments on the anode can also be used to study the metal dissolution issue of lithium cobalt oxide-based material. Therefore, the float charge method associated with ICP measurement (referred to hereafter as "floating experiment") is a feasible way to evaluate the side reaction and metal dissolution of lithium cobalt oxide-based cathode materials at high voltage and elevated temperature. In the present study, floating experiments are performed in order to evaluate the stability of cathode materials at high voltage charging and at elevated temperature (50° C.). In some embodiments, the tested cell configuration are coin cells that are assembled as follows: two separators (from SK Innovation) are located between a positive electrode (previously described) and a negative graphite electrode (Mitsubishi MPG). The electrolyte is 1M $LiPF_6$ in EC/DMC (1:2 volume ratio) solvents. The prepared coin cells are submitted to the following charge protocol: the coin cell is first charged to a defined upper voltage (4.45V or 4.5V vs. graphite) at constant current mode with a C/20 rate taper current (with 1 C=160 mAh/g), then is kept at constant 4.45V voltage (CV-mode) for 120 hours at 50° C. After the floating experiment, the coin cells is disassembled. The anode and the separator in contact with the anode are analyzed by ICP-OES for metal dissolution analysis. Float storage data for EX1, 2 and 3 are shown on Table 4. EX2 and 3 deliver a lower float capacity and lower Co metal elution during the float storage test at 4.45V compared to EX1. Also, the float capacity and the Co metal elution decreases when the amount of Mg+Al dopant increases from EX1 (~0.53 mol %), to EX2 (~1.0 mol %) and EX3 (~2.0 mol %).

TABLE 4

50° C., 120 h floating storage data of EX1, 2 and 3 at 4.45 V (vs. graphite anode).

Figure 6:
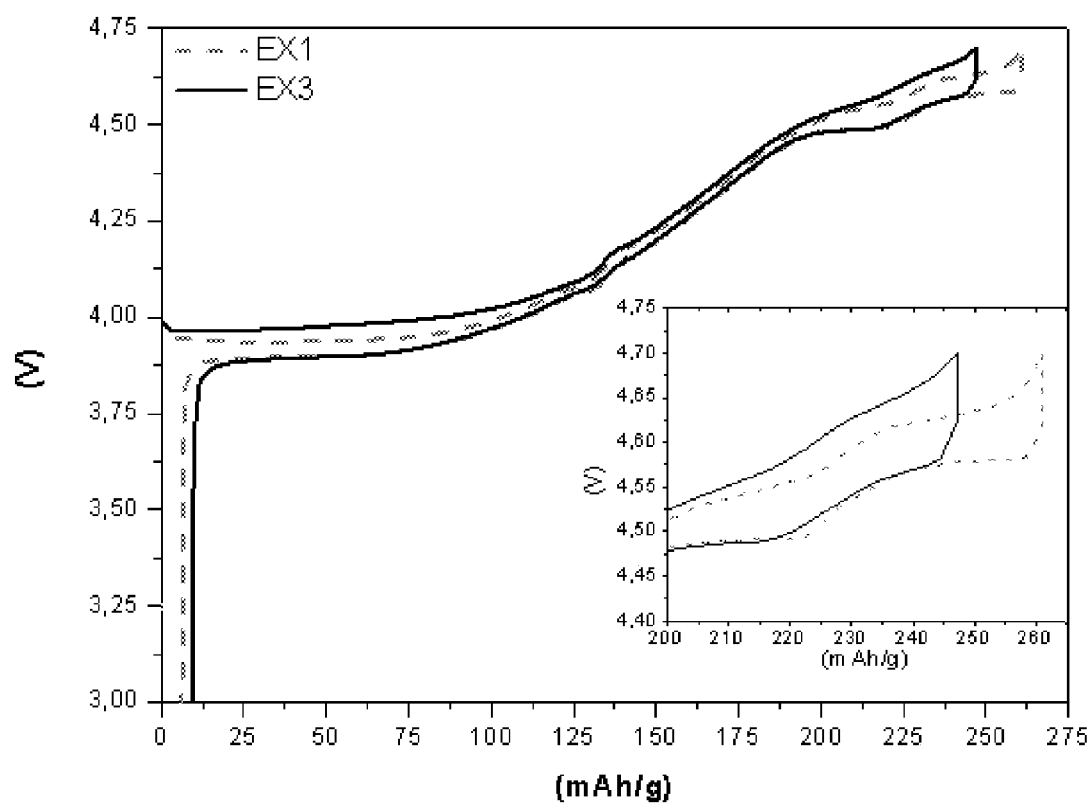
FIG. 6: Evolution of cell voltage (in V vs. Li-metal) as function of capacity (in mAh/g) for EX1 and EX3 in the 4.70~3.0V range.

| | QFloat_4.45 V (mAh/g) | Co_4.45 V (mg) |
|---|---|---|
| EX1 | 163.4 | 0.504 |
| EX2 | 94.0 | 0.242 |
| EX3 | 83.1 | 0.184 | dQ/dV experiment during charge and discharge: FIG. 6 shows the voltage (vs. Li-metal) as a function of capacity for the first charge and discharge cycle of EX1 and EX3 in the 4.70V~3.0V (vs. Li-metal) range. The charge and discharge is done at C/10 rate with 1 C=160 mA/g current definition. Data points are recorded every 600 second time interval and/or every 100 mV voltage change and/or every 0.1 mA current change. The charge profiles of both materials are very different. The charge curve of EX1 shows two small plateaus near 4.15V corresponding to the order-disorder phase transition (at x~0.5 in $Li_x$ metal oxide) and the two plateaus at 4.55V and 4.63V correspond to the 2-phase transition from O3 phase to the H1,3 phase and then to the O1 phase. For EX3 however, it is difficult to observe any plateaus above 4.2V in the charge curve and also, as shown on the insert of FIG. 6, significant higher polarization at the vicinity of the high voltage H1,3 and O1 transitions is reported. The charge capacity (CQ in mAh/g), discharge capacity (DQ in mAh/g) and irreversible capacity (Qirr. in %) values at 4.7V vs. Li-metal are given in Table 3. The charge capacities at 4.70V are different for both materials and lower by about 13 mAh/g for EX3 compared to EX1, showing that less Li is extracted in EX3 compared to EX1, which is believed to be due to increased polarization at high voltage.

The discharge portions of the voltage-capacity curves for the two samples are also quite different. For EX1, all the plateaus observed during charge have counterparts in the discharge curve. For EX3 very short and less defined plateaus are observed at both circa 4.6V and 4.5V (vs. Li metal). The dQ/dV differentiated values are numerically calculated by averaging the slopes of two adjacent points for each $(V_i, Q_i)$ data point as follows:

$$\left(\frac{dQ}{dV}\right)_{V=V_i} \sim \frac{\Delta Q_i}{\Delta V_i} = \frac{1}{2}\left(\frac{Q_{i+1} - Q_i}{V_{i+1} - V_i} + \frac{Q_i - Q_{i-1}}{V_i - V_{i-1}}\right).$$

Figure 7:
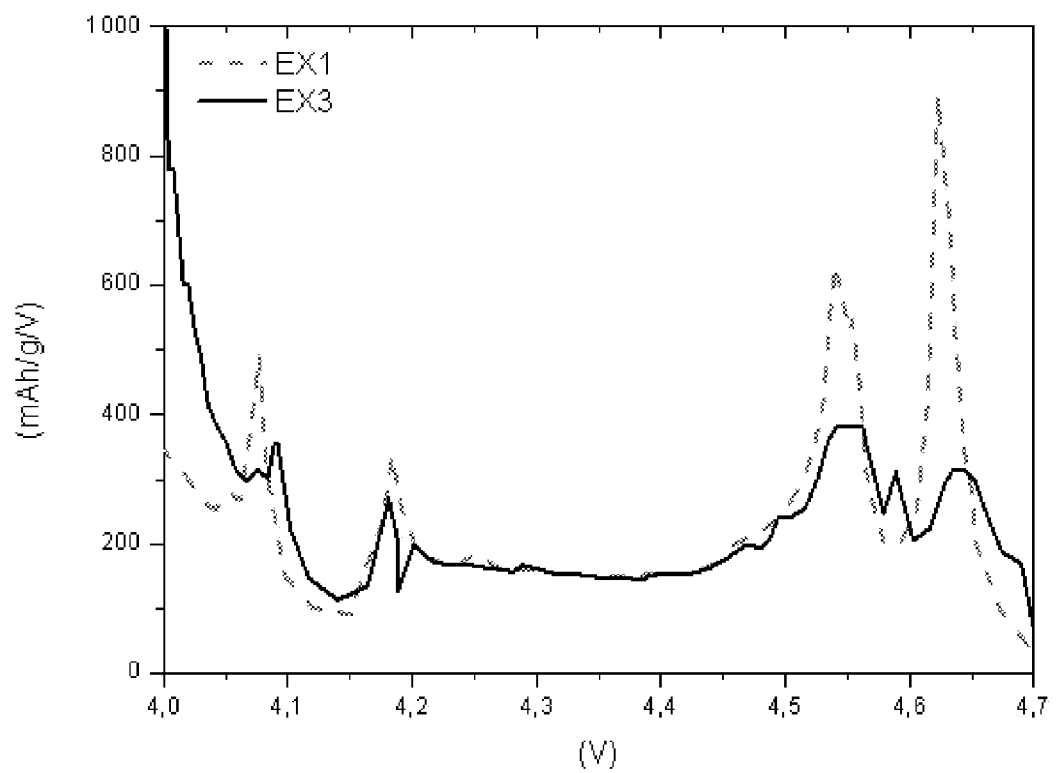
FIG. 7: Evolution of the absolute value of the differential capacity dQ/dV (in mAh/g/V vs. Li-metal) as function of cell voltage (in V vs. Li-metal) for EX1 and EX3 during the first charge between 3.0 and 4.70V.

When the differential capacity, dQ/dV, is plotted as function of the cell potential, plateaus in voltage-capacity curves appear as peaks. FIG. 7 shown the absolute value of the dQ/dV as function of voltage (vs. Li-metal) during the first charge for EX1 and EX3. Above 4.3V, the charge curve of EX1 has two peaks at 4.55V and 4.63 V, respectively. These two peaks with dQ/dV~631mAh/g/V and 891 mAh/g/V, respectively, and corresponding to the highest two plateaus in the charge curves in FIG. 6, represent the phase transitions from the O3 phase to the H1,3-phase and then to the O1 phase. These two phase transitions are very difficult to observe for EX3 and, above 4.3V, dQ/dV≤385mAh/g/V.

Figure 8:
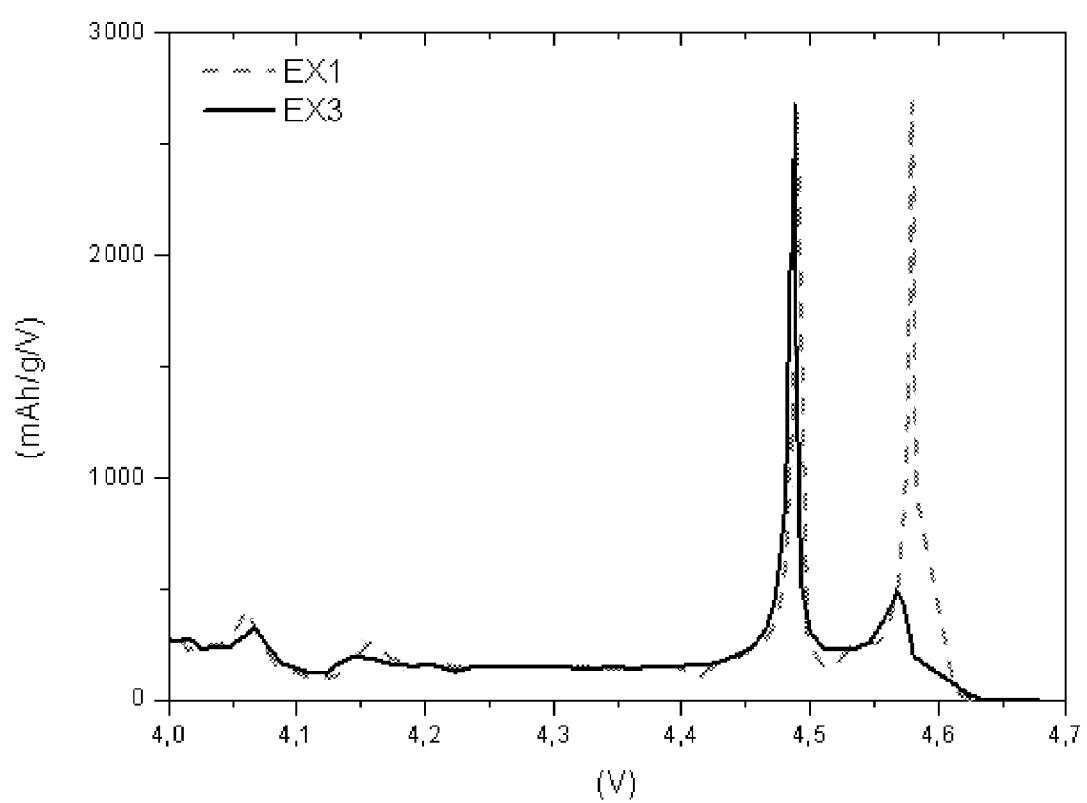
FIG. 8: Evolution of the absolute value of the differential capacity dQ/dV (in mAh/g/V vs. Li-metal) as function of cell voltage (in V vs. Li-metal) for EX1 and EX3 during the first discharge between 3.0 and 4.70V.

FIG. 8 shows the absolute value of the dQ/dV as function of voltage (vs. Li-metal) during the first discharge for EX1 and EX3. As expected, EX1 shows two peaks in the discharge part of the dQ/dV curve, that correspond to the reverse reactions of the 4.55 and 4.63V peaks in the charge curves. The absolute values of dQ/dV for these two peaks are resp. 2689 mAh/g/V at 4.58V and 2666 mAh/g/V at 4.49V. For EX3 however, a weaker peak is observed near 4.57V with a maximum of 490 mAh/g/V, about 18% of the peak maximum observed for EX1. The second peak near 4.49V has a maximum of 2680 mAh/g/V and is comparable to EX1. This finding suggests that the nature of the H1,3 and O1 transitions are strongly affected and suppressed in EX3, as compared to EX1.

Example 2

EX1, EX2 and EX3 cathode materials are fitted into 1600mAh pouch cells (length×width×depth=60×44×5 $mm^3$). The cathode slurry is prepared by mixing 96 wt % of EX1, EX2 and EX3 cathode active materials, 1 wt % Super-P (Timcal), 1 wt % KS-6 graphite (Timcal), 2 wt % KF1700 PVDF binder solution in NMP solvent (Kureha) and by adding an appropriate amount of NMP solvent (Mitsubishi chemical electronics grade). The cathode slurry is two-side coated on an aluminum foil. The typical cathode electrode density is 3.8 to 3.9 g/cc. The graphite anode is prepared with natural graphite coated on copper foil, the loading weight is 8 $mg/cm^2$, and the density 1.5 mg/cc. The separator is commercially available from Asahi with reference NH312. The electrolyte is commercially available from PanaxEtec with a mixture of EC/DMC=30/70 vol./vol. ratio with 1M $LiPF_6$ salt concentration and 2 vol % VC additive. The pouch cells are then pre-charged, degassed, sealed and undergo a formation process in order to be used at an operating voltage of 4.40V vs. graphite (~4.45V vs. Li-metal). The as-prepared cells are subjected to a float-current constant voltage storage at 4.40V and 50° C. for 7 days (168 h) with a maximum current of 100 mA. The cell thickness is recorded during the duration of the storage by means of a thickness gauge.

Figure 9:
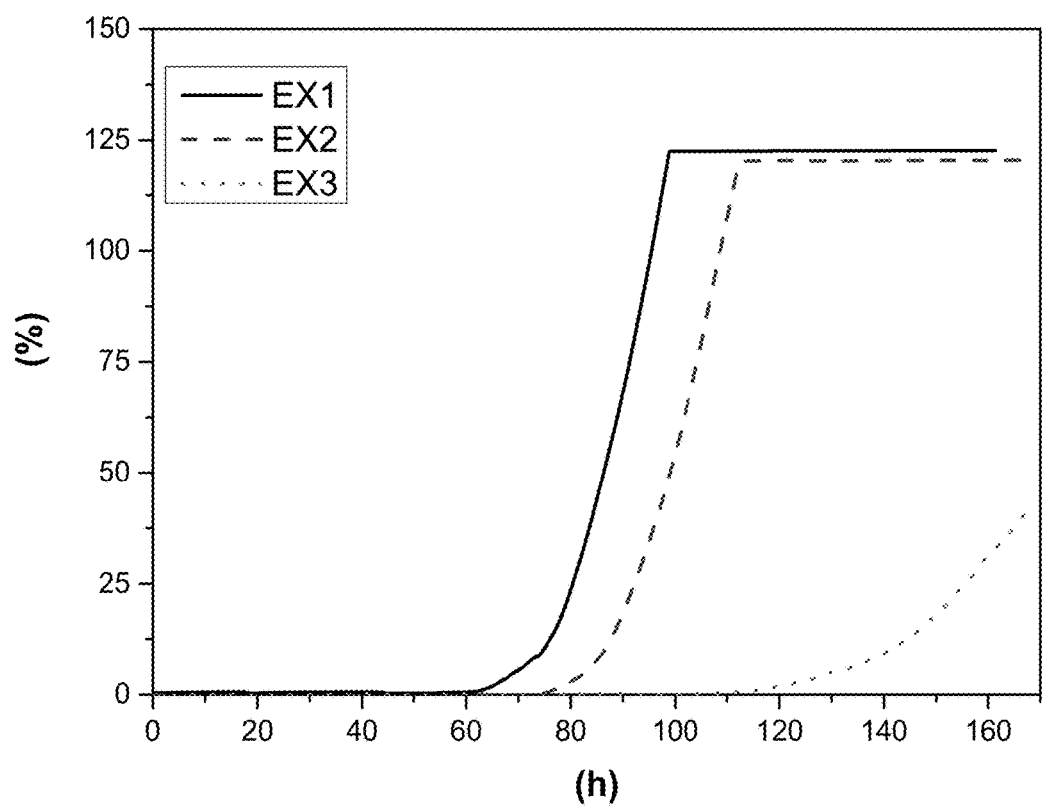
FIG. 9: Time (hours) evolution of pouch cell thickness (in %) as function of float current constant voltage storage at 4.40V and 50° C.

The evolution of cell thickness for cells fitted with EX1, EX2 and EX3 cathode materials is shown on FIG. 9. After 7 days storage, the thickness increase is about 120% for EX1 and EX2, and only 42% for EX3. The onset of gas generation is found to be 62 h, 72 h and 100 h for EX1, EX2 and EX3, respectively. Note that the rate of thickness increase for EX3 is slower than for EX1 and EX2. The eluted and deposited cobalt on the anode is further measured by ICP and found to be 0.091 $mg/cm^2$, 0.052 $mg/cm^2$ and 0.026 $mg/cm^2$ for EX1, EX2 and EX3, respectively. The mechanism responsible for the cell thickness increase is the gas generation inside the cell, due to side reactions with electrolyte at high voltage, or other parasitic reactions such as structural instability of cathode materials at high voltage, resulting in metal elution and decomposition of anode SEI. The test is a key experiment to assess the applicability of cathode materials in demanding consumer electronic applications. The results shows that EX2 and EX3 are better suited for application in a state-of-the-art Li-ion pouch cells where EX1 is less, because of larger and faster gas generation leading to the unsafe operation of the battery. It is believed that the increase of aluminum and magnesium doping generates less side reactions with electrolyte and provides an enhanced structural stability for EX2 and EX3 cathode materials at high voltage.

Example 3

This example will demonstrate that the Al, Mg and Ti content in the core of the particles is less than the overall composition of these elements in the powder, to conclude that the materials of the present invention feature an enriched distribution of Mg, Ti and Al at the surface of the particles. The surface of the particles also comprises core elements such as Li and Co in lower amounts than their atomic content in the core.

Wavelength-dispersive X-ray spectroscopy (WDS) is measured on the cross-section of EX1 particles. Powder of EX1 has been dispersed in epoxy resin. After polymerization, the resin bloc containing the dispersed EX1 particles is mechanically polished on polishing clothes in order to reveal the particle cross sections. WDS is performed on a Jeol JXA-8800M. The current was set to 50 nA with an acceleration tension of 20 kV. Count time was 50 s Co Kα, Mg Kα, Ti Kα and Al Kα signals were acquired and quantified as wt % of $Co_2O_3$, MgO, $TiO_2$ and $Al_2O_3$, respectively. The ICP metal composition of Example 1 is $Co_{0.9914}Mg_{0.0032}Ti_{0.0028}Al_{0.0026}$. WDS is conducted on 40-selected particle cross-sections with diameter ranging from 15 to 25 μm. The composition determined by WDS is $Li_{0.9955(2)}Co_{0.9957(2)}Mg_{0.0027(2)}Ti_{0.0014(1)}Al_{0.0002(1)}O_{2\pm\delta}$ where the value between parentheses indicates the standard deviation. The atomic contents of Mg, Ti and Al in the core of the particles of EX1 are significantly inferior to the correspondingICP atomic contents.

To summarize, the findings of Example 1, 2 and 3 on EX1, 2 and 3 materials confirms that (i) Mg, Ti and Al distribution is inhomogeneous in the sample, that (ii) the core of the particle has lower Mg, Ti and Al compared to the shell, and that the profile of each of the Al, Mg and Ti contents follows a gradient-like evolution.

The invention claimed is:

1. A lithium metal oxide powder for a cathode material in a rechargeable battery, comprising a core material and a surface layer, the core material having a layered crystal structure consisting of the elements Li, a metal M and oxygen, wherein the metal M has the formula $M=Co_{1-a}M'_a$, with $0 \leq a \leq 0.05$, wherein M' is Al or M' is Al and one or more elements selected from the group consisting of Mg, Ti, Ga and B;
   wherein the surface layer comprises Li and Co;
   wherein the surface layer further comprises inorganic N-based oxides or inorganic N-based lithiated oxides, wherein N is Al, Ti and Mg or N is Al, Ti, and Mg and one or more metals selected from the group consisting of Fe, Cu, Ca, Ba, Y, Sn, Sb, Na, Zn, Zr and Si;
   wherein the molar ratio (Mg+Al):Co of the lithium metal oxide powder is higher than 0.004; and
   wherein the sum of Mg, Al and Ti molar contents in the core material is less than the sum of Mg, Al and Ti molar contents in the surface layer.

2. The lithium metal oxide powder of claim 1, wherein the molar ratio Li:(Co+Al) is more than 0.98 and less than 1.01.

3. The lithium metal oxide powder of claim 1, having a mean particle size D50 of at least 15 μm.

4. The lithium metal based powder of claim 1, wherein the powder has a bimodal particle shape distribution where the small particle size fraction has a D50≤5 μm and is between 3 to 20 Vol %, and where the large particle size fraction has a D50≥15 μm.

5. The lithium metal oxide powder of claim 1, wherein the thickness of the surface layer is 1 μm or less.

6. The lithium metal oxide powder of claim 1, wherein a>0 and the Al:Co molar ratio in the surface layer is more than 2a/(1−a).

7. The lithium metal oxide powder of claim 1, wherein either one or more of the Mg:Co and Ti:Co molar ratios in the surface layer is more than 2 times the corresponding Mg:Co or Ti:Co molar ratios in the lithium metal oxide powder.

8. The lithium metal oxide powder of claim 1, wherein the molar ratio Mg:Co in the lithium metal oxide powder and the molar ratio Al:Co in the lithium metal oxide powder are both higher than 0.009.

9. The lithium metal oxide powder of claim 1, comprising monolithic, potato-shaped and non-agglomerated particles.

10. The lithium metal oxide powder of claim 1, having a Brunauer-Emmett-Teller (BET) surface area lower than 0.3 $m^2/g$.

11. The lithium metal oxide powder of claim 1, having a Carbon content less than 50 ppm.

12. The lithium metal oxide powder of claim 1, having a soluble base content less than 25 μmol/g.

13. A cathode in an electrochemical cell comprising the lithium metal oxide powder according to claim 1.

14. The lithium metal oxide powder of claim 1, wherein the molar ratio Mg:Co of the lithium metal oxide powder or the molar ratio Al:Co of the lithium metal oxide powder is higher than 0.004.

15. The lithium metal oxide powder of claim 1, wherein the molar ratio Mg:Co of the lithium metal oxide powder and the molar ratio Al:Co of the lithium metal oxide powder are both higher than 0.004.

16. The lithium metal oxide powder of claim 1, wherein a>0.

17. A lithium metal oxide powder for a cathode material in a rechargeable battery, comprising a core material and a surface layer, the core material having a layered crystal structure consisting of the elements Li, a metal M and oxygen, wherein the metal M has the formula $M=Co_{1-a}M'_a$, with $0<a \leq 0.05$, wherein M' is Al and one or more elements selected from the group consisting of Mg, Ti, Ga and B;
   wherein the surface layer comprises Li and Co;
   wherein the surface layer further comprises inorganic N-based oxides or inorganic N-based lithiated oxides, and wherein N is Al, Ti and Mg or N is Al, Ti, and Mg and one or more metals selected from the group consisting of Fe, Cu, Ca, Ba, Y, Sn, Sb, Na, Zn, Zr and Si;
   wherein the molar ratio (Mg+Al):Co of the lithium metal oxide powder is higher than 0.004; and
   wherein the sum of Mg, Al and Ti molar contents in the core material is less than the sum of Mg, Al and Ti molar contents in the surface layer.

18. A lithium metal oxide powder for a cathode material in a rechargeable battery, comprising a core material and a surface layer, the core material having a layered crystal structure consisting of the elements Li, a metal M and oxygen, wherein the metal M has the formula $M=Co_{1-a}M'_a$, with $0<a \leq 0.05$, and wherein M' comprises Ti, Ga or B;
   wherein the surface layer comprises inorganic N-based oxides or inorganic N-based lithiated oxides, wherein N is Al, Ti and Mg or N is Al, Ti, and Mg and one or more metals selected from the group consisting of Fe, Cu, Ca, Ba, Y, Sn, Sb, Na, Zn, Zr and Si;
   wherein the molar ratio (Mg+Al):Co of the lithium metal oxide powder is higher than 0.004; and
   wherein the sum of Mg, Al and Ti molar contents in the core material is less than the sum of Mg, Al and Ti molar contents in the surface layer.

* * * * *